May 3, 1966  E. H. KUHN  3,248,956

MOTION TRANSLATION MECHANISM

Filed June 5, 1964

INVENTOR.
EDWARD H. KUHN
BY
Richard C. Steinmetz Jr.

United States Patent Office 3,248,956
Patented May 3, 1966

3,248,956
MOTION TRANSLATION MECHANISM
Edward H. Kuhn, Whitefish Bay, Wis., assignor to Allen-Bradley Company, Milwaukee, Wis., a corporation of Wisconsin
Filed June 5, 1964, Ser. No. 372,873
4 Claims. (Cl. 74—54)

This invention is directed to a simple motion translation structure with reliable and positive operation which necessarily results in substantially increased overall efficiency and output proficiency as well as increased life of both the unit to be moved and the translation structure itself.

In particular, the motion translation structure comprises a cam adjustable by means of a disk with ball and lug locking structure, along with linkage which is motivated by the cam to assure complete, positive and independent movement of the ultimate consumer of the translated motion (e.g. the switch shown in the drawings) through independently movable follower and lever members.

It is therefore an object of this invention to provide a motion translation structure which incorporates a minimum of parts while insuring positive operation.

Another object of this invention is to provide a motion translation structure which is readily adaptable to miniaturization.

Another object of this invention is to provide an adjustable motion translation structure with positive locking coupled with ease in adjustment to an infinite number of operating positions.

Another object of this invention is to provide a motion translation structure with positive locking which is of a simple construction utilizing a minimum of parts.

Another object of this invention is to provide a motion translation structure which permits an independence of movement between the input and output elements of the structure.

Other objectives of this invention are and will become apparent from the following description.

FIG. 2 shows a partial cross-sectional, side view of the cam unit depicted in FIG. 1; the view being taken along the line 2—2 of FIG. 3.

FIG. 3 shows a cross-sectional, end view of the cam unit taken along line 3—3 of FIG. 2.

FIG. 4 shows a front view of the linkage utilized intermediate the cam unit and switch of FIG. 1.

FIG. 5 shows a cross-sectional, side view of the linkage taken along line 5—5 of FIG. 4.

FIG. 6 is an isometric view of the lever member and spring taken from the linkage shown in FIGS. 1, 4 and 5.

While the attached drawings show particular embodiments of the invention, it will be understood that the scope of the invention is not limited by these embodiments; and in particular, it is the appended claims which are considered and intended to constitute the scope of the invention.

Figure 1:
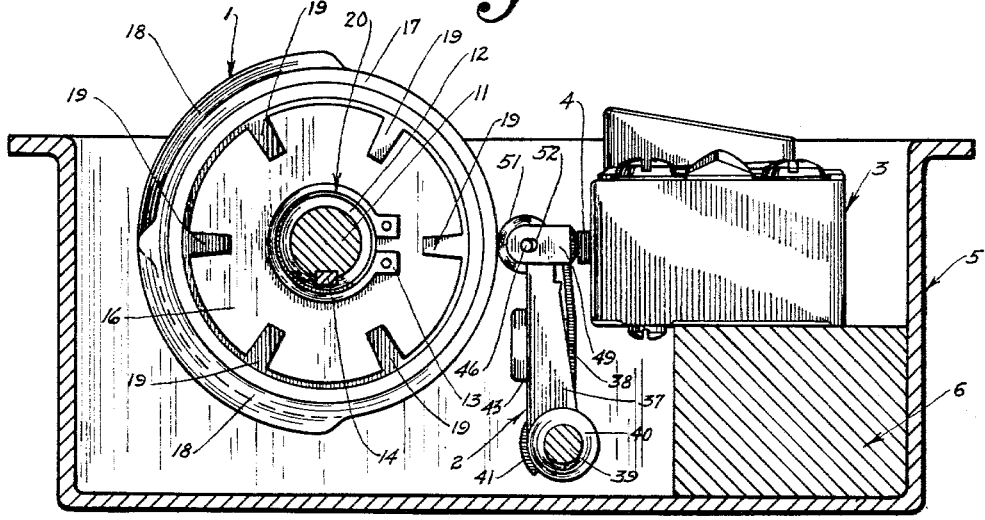
FIG. 1 shows a side elevation drawing of a particular embodiment of the motion translation structure utilized to operate an electric switch incorporating a cam unit which is separated from the switch by a pivoted linkage.
Figure 1:
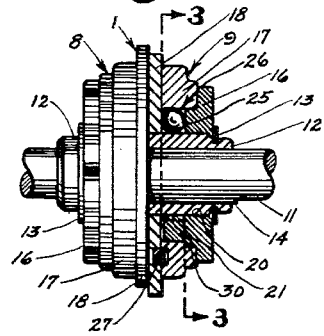
Figure 1:
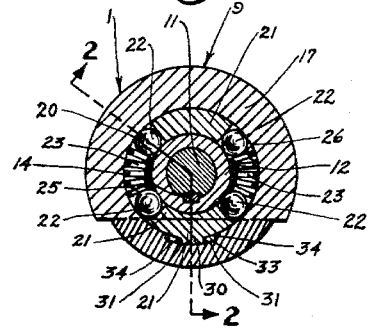
Figure 1:
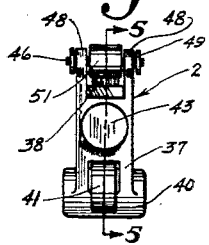
Figure 1:
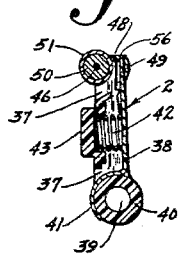
Figure 1:
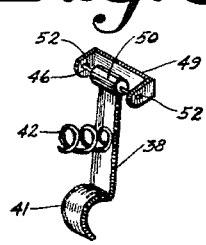

Turning to the drawings: FIG. 1 shows the motion translation structure, viz. cam unit 1 and linkage 2, used in activating a switch 3 through the movement of plunger 4. The switch 3, itself, is of a known type incorporating a snap-over, switching point with subsequent over travel by the plunger 4 (not shown); but since the particular unit which is to be moved by the motion translation structure is a matter of choice, further description of the switch is not considered necessary. A housing 5 is used to enclose the structure within which block 6 supports switch 3.

The cam unit 1 is made up of back-to-back, subassemblies 8 and 9 which reflect each other in construction and are best shown in FIG. 2. Shaft 11 journaled in housing 5 (not shown) and inner hub 12 support the cam unit 1 while retaining rings 13 relate the subassemblies 8 and 9 with respect to inner hub 12. As can be seen from FIGS. 1 through 3, a key 14 is used to connect shaft 11 with inner hub 12.

Each subassembly 8 or 9 comprises three basic parts, viz. adjusting disk 16, outer hub 17 and cam 18. As best seen from FIG. 1, the outer end of adjusting disk 16 has a plurality of radial slots 19 which are to be used for adjusting the position of cam 18—the adjustment to be described later.

Inner hub 12 provides an outer cylindrical surface 20 about which the adjusting disk 16, outer hub 17 and cam 18 each rotate. Extending from the inside surface of adjusting disk 16 is a pair of opposed, arcuate lugs 21 which themselves rotate upon inner hub 12 (see FIGS. 2 and 3). Abutting each end of lugs 21 is a ball 22 or its equivalent, e.g. rollers, with adjacent balls being separated by a spring 23 (see FIG. 3). These balls 22 and spring 23 combinations are confined within each subassembly 8 or 9 by lugs 21, as previously described; outer cylindrical surface 20 of inner hub 12; adjusting disk 16 (by means of flange 25 thereon); outer hub 17 (by means of bore 26) and the plane surface of cam 18. Connecting outer hub 17 and cam 18 is a key 27 as best shown in FIG. 2.

Because the balls 22 normally rest in a force fit relation with respect to the elements of the subassemblies 8 and 9 which confine them, viz. inner hub 12, adjusting disk 16, outer hub 17, cam 18 along with springs 23 (see FIG. 3), rotation of shaft 11 can thereby be transferred to the cams 18 through inner hub 12. However, by releasing the force fit of the balls 22, cam 18 rotates freely on inner hub 12 for adjustment thereof with respect to the shaft 11.

The release of the balls 22 from the force fit shown in FIG. 3, is made possible by constructing one of the confining surfaces to include a track for each ball 22. Thus, movement of the balls 22 away from the force fit position will result in relative freedom of motion among the confining parts. To illustrate such a relationship, the drawings show the bore 26 of outer hub 17 to be eccentric with respect to shaft 11. Thus, when lugs 21 of adjusting disk 16 are rotated from the position of FIG. 3 (which rotation may be in a clockwise or counterclockwise direction), those balls 22 which are in the path of rotation are moved until they no longer restrict movement between eccentric bore 26 and cylindrical surface 20 which necessarily frees cam 18. As is evident from FIG. 3, springs 23 help to guide balls 22 as the latter are moved from their force fit position; but at the same time springs 23 are compressed in order to assure return of balls 22 to their force fit position, i.e. after the adjusting torque is removed from adjusting disk 16, the compressed springs 23, through balls 22, counter-rotate lugs 21 of disk 16 and thereby return balls 22 to their force fit position of FIG. 3.

Once cam 18 has been freed to move independently of shaft 11, the desired adjustment of cam 18 can be accomplished by further rotation of adjusting disk 16. As will be seen from FIGS. 2 and 3, a tab 30 with opposite ends 31 extends from the inside surface of adjusting disk 16 into a peripheral slot 33 (with ends 34) of outer hub 17. By making slot 33 longer than tab 30, initial rotation of disk 16 will not rotate hub 17 or attached cam 18, i.e. contact between end 31 of tab 30 and end 34 of slot 33 will be delayed. By this delayed contact between the rotating surfaces, not only can balls 22 be moved from their force fit position of FIG. 3 before adjusting cam 18, but any need for relatively close tolerances among the elements which make up the force fit itself are thereby eliminated. After ends 31 and 34 abut, the adjusting rotation of disk 16 will be transferred to the cam 18 by way of outer hub 17. Conversely, after cam 18 has been adjusted, a rotation of the adjusting disk 16—in a direction opposite to that used to adjust— will separate end 31 from end 34; and after springs 23 force the displaced balls 22 back to their force fit position, i.e. the locked position shown in FIG. 3, the subassembly 8 or 9 will once again transfer the rotation of shaft 11 to cam 18 but in its adjusted position.

It should be noted at this point that the number of tabs 30, as well as the number of lugs 21 and corresponding number of balls 22 with springs 23 is a matter of design so that the invention is not necessarily limited to those members in the embodiment described herein.

Thus, the force fit relationship of the balls 22 with respect to the subassemblies 8 and 9 permits rotation of shaft 11 to be imparted to the cams 18 while adjustment of the cams 18 utilizes corresponding rotation of adjusting disk 16 to first free balls 22 from their force fit relationship and then to adjust the cam 18, itself, as adjusting disk 16 through tab 30 turns outer hub 17 which is connected to cam 18.

FIG. 2 shows the advantage of using the subassemblies 8 and 9 in back-to-back relationship, i.e. the availability of two cams 18 permits adjustment of the contact time as well as the dwell time.

The linkage 2 comprises a follower 37 and a lever 38, both of which are pivoted about shaft 39. FIG. 5 best shows this pivotal relationship, viz. hub 40 of follower 37 about which end 41 of lever 38 is bent to thereby facilitate a simplified structure. Follower 37 and lever 38 are separated by a compression spring 42—the follower 37 abutting spring 42 through an integral cup 43.

At an end opposite from the shaft 39, the follower 37 is joined to lever 38 by a pin 46 which runs through bifurcated end portions 48 of follower 37 (see FIG. 4) and through the leg portions of U-shaped abutment piece 49 at the end of lever 38 (see FIG. 6). Located intermediate the ends of pin 46 is a bushing 50 about which roller 51 is looped so that follower 37 will be accessible to an outside source of movement, e.g. cam unit 1. To permit independent movement between the lever 38 and follower 37, pin 46 rides in a slot 52 of the leg portions in U-shaped piece 49, said slot 52 being of a predetermined length to control spring force as well as to permit return overtravel of plunger 48 as will be explained later.

In operation, the rotation of shaft 11 is conveyed to cams 18 through inner hub 12 and the force fit of balls 22. Linkage 2 transforms this rotary motion to linear motion by pivoting in response to the variation in cam surface. In particular, cams 18 abut roller 51 of linkage 2 to thereby move bushing 50 and pin 46 connected to the bifurcated ends 48 of follower 37, which ends are normally separated from U-shaped piece 49 at 56 (see FIG. 5) by compression spring 42. Assuming sufficient force to initially oppose movement of lever 38, e.g. plunger 4 of switch 3, movement of bifurcated ends 48 and follower 37 toward a relatively stationary lever 38 compresses the spring 42 and moves pin 46 in stationary slot 52. At a certain point during this travel of follower 37 (depending upon the design), either the bifurcated ends 48 will contact U-shaped piece 49 so that further movement of follower 37 necessitates movement of lever 38 and its opposing force therewith, or before such contact the spring 42 will overcome the opposing force of lever 38; but in either case, follower 37 moves lever 38 thereafter.

In the particular structure of the drawings, plunger 4 of switch 3 offers the above-mentioned opposing force to lever 38 so that once spring 42 is sufficiently compressed (or ends 48 abut U-shaped piece 49) plunger 4 begins to move and the relative location between the follower 37 and lever 38 remains constant until such time as the switch 3 reaches its snap-over position. Further movement of plunger 4 constitutes overtravel which offers a smaller opposing force to the linkage 2. At this point spring 42, having been compressed during the initial movement of linkage 2, is of sufficient strength to immediately overcome this remaining opposing force of plunger 4 and thereby force lever 38 to complete the overtravel stroke of switch plunger 6 independently of follower 37. It is this positive and instantaneous completion of the overtravel stroke which is so important, particularly to use shown in the drawing since switch life is significantly increased by self adjustment to contact wear which in itself is substantially reduced.

But accommodation of overtravel is not limited to movement in one direction, i.e. the return of pivoted linkage 2 and plunger 4 to the position of FIG. 1 will also permit overtravel in plunger 4. This is accomplished through slot 52 which, in addition to its function as outlined above, establishes—by its predetermined length—a maximum separation distance between follower 37 and lever 38, said separation being encouraged by spring 42. With such a known dimension, the pivoted linkage 2 can be located between cam unit 1 and switch 3 so that plunger 4 will be free to move to its limit in a return direction when the raised portion of cam 18 no longer abuts roller 51, i.e. the position as shown in FIG. 1. To facilitate such permissible overtravel, small gaps or play may be left between linkage 2, plunger 4 and cam unit 1 when linkage 2 is in the FIG. 1 position with the adjustment of switch 2's location on block 6 suggested as one means to establish said play. In this regard, the linkage construction 2 provides the additioinal advantage of ease in overall unit assembly since switch 3, which may be adjustably mounted upon block 6, need not be precisely located with respect to linkage 2 in order to assure full overtravel of plunger 4 in either direction.

As will be understood, the particular direction of shaft 11 rotation does not affect the invention. Moreover, uses other than switch 2 are contemplated for the invention, e.g. pneumatic or hydraulic pilot valves.

I claim:

1. Motion translation means comprising an adjustable cam means, adjusting means adjacent said cam means, ball means to lock said cam means with respect to said adjusting means by a force fit, first resilient means abutting said ball means to bias same against said adjusting means, track means which guide said ball means when moved by said adjusting means to thereby release said force fit, linkage means abutting said cam means comprising follower means and lever means each pivoted at a same end, second resilient means biasing said follower and lever means in opposite directions and means to permit movement of said lever means independently of said follower means.

2. The motion translation means of claim 1 including first lug means in said adjusting means against which said ball means are biased and second lug means which rotate said cam means with said adjusting means after said force fit has been released.

3. The motion translation means of claim 1 in which said cam means rotates on a shaft and said track means comprises a surface which is eccentric with respect to the rotation of said cam.

4. The motion translation means of claim 1 wherein said cam means and adjusting means rotate about a common shaft, first lug means on said adjusting means against which said ball means are biased, second lug means which rotate said cam means with said adjusting means after said force fit has been released, said track means comprising a surface which is eccentric with respect to the rotation of said cam.

References Cited by the Examiner
UNITED STATES PATENTS

| | | | |
|---|---|---|---|
| 1,077,395 | 11/1913 | Deats. | |
| 1,581,117 | 4/1926 | Haynes. | |
| 2,207,332 | 7/1940 | Paxton | 74—569 |
| 2,644,047 | 6/1953 | Leonard | 200—153.13 X |
| 2,787,353 | 4/1957 | Spraragen | 192—8 |
| 2,817,725 | 12/1957 | Rochfort et al. | 200—47 |
| 2,914,153 | 11/1959 | Krause et al. | 192—8 |

MILTON KAUFMAN, *Primary Examiner.*

BROUGHTON G. DURHAM, *Examiner.*

DALE H. THIEL, *Assistant Examiner.*